Dec. 17, 1935.    R. D. MERSHON    2,024,240
ELECTROLYTIC RECTIFIER AND CONDENSER
Filed April 19, 1934
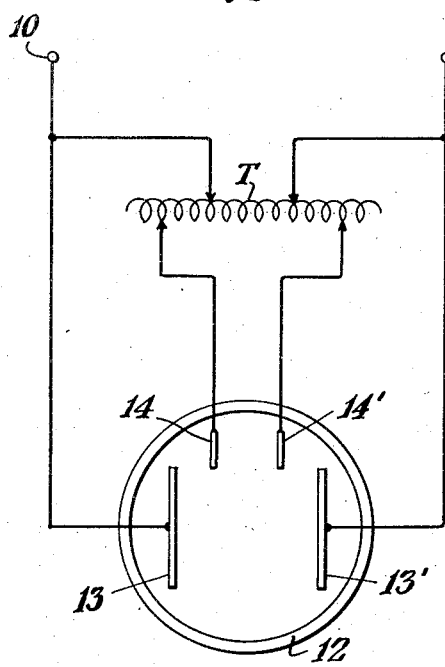
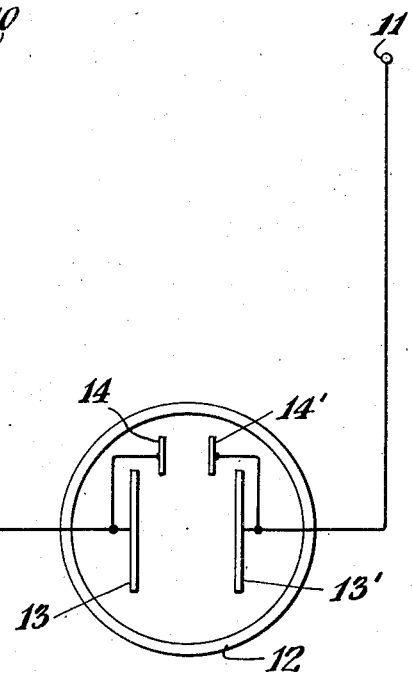
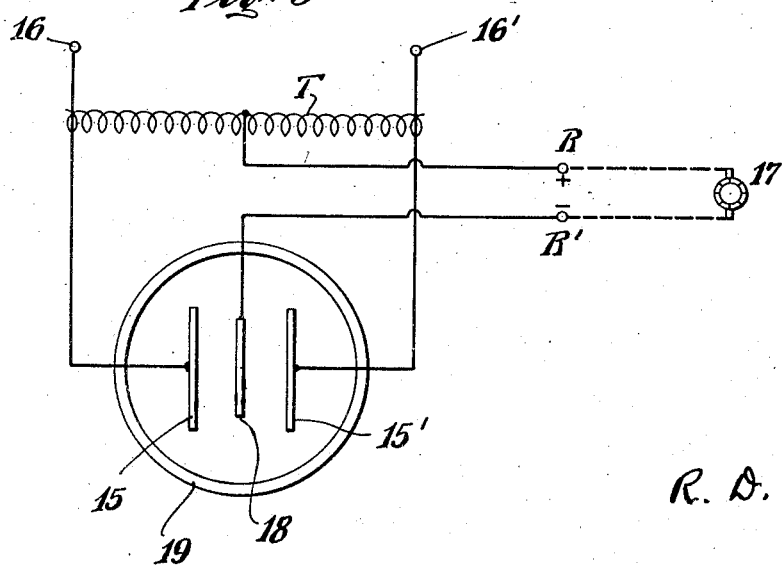
R. D. Mershon
INVENTOR
BY Cooper, Kerr & Dunham
ATTORNEYS Patented Dec. 17, 1935

2,024,240

UNITED STATES PATENT OFFICE 2,024,240

ELECTROLYTIC RECTIFIER AND CONDENSER

Ralph D. Mershon, New York, N. Y.

Application April 19, 1934, Serial No. 721,281

9 Claims. (Cl. 175—315)

This invention relates to electrolytic devices employing electrodes coated with a film such as may be formed on the surface of magnesium, tantalum, and aluminum (the latter term being used herein generically to include aluminum alloys also), by immersing the metal in an electrolyte and impressing E. M. F. upon it as anode. Such films have high dielectric capacity, and possess the remarkable property of unilateral conductivity, offering high resistance to the flow of current by conduction through the film when the voltage (electromotive force) on the electrode is positive and relatively slight resistance to conductive flow when the voltage on the electrolyte in which the filmed electrode is immersed is positive. The E. M. F. exerted on the film and tending to force current through it by conduction is known as "film stress". The unilateral conductivity or resistance is made use of in a rectifier, for converting alternating current into direct. Thus if a filmed aluminum electrode is immersed in an electrolyte and connected to one terminal of a source of alternating voltage and current, and an electrode of carbon or non-filming metal is immersed in the electrolyte and connected to the other terminal of the source referred to, then when the voltage is positive on the filmed electrode very little if any current will flow through the film because of its high resistance in that direction, but when the voltage reverses, so that the unfilmed electrode (and hence the electrolyte also) becomes positive, current will flow through the unilaterally conductive film to the metal of the filmed electrode; thus converting the alternating current and voltage into direct. This flow of current involves "perforation" or breaking down of the film; but when the alternating voltage again reverses, making the filmed electrode positive and the electrolyte negative, the film is instantly re-formed where it had broken down, so that it again offers high resistance to current flow from the electrode to the electrolyte. The re-formation of the film is effected at the expense of the metal underneath and hence the latter undergoes a certain amount of corrosion when the rectifier is in operation, with consequent injury to the electrode which may amount to virtual destruction in the course of time.

If two filmed electrodes are immersed in an electrolyte and connected with a source of alternating current and voltage the apparatus operates as a condenser; but in doing so the first action is to charge the electrolyte negatively with respect to the electrodes (or anodes, as they are commonly termed when used in a condenser).

The establishment of this negative charge and its subsequent maintenance by the condenser is accompanied by alternate breakdown and re-formation of the films, as explained in my prior Patent No. 1,077,628, of November 4, 1913. This is in fact a rectifying action, and the net result is that the anodes are subjected to corrosion and the efficiency of the condenser is impaired. It is therefore necessary, if long life and efficient operation are desired, to provide means other than the anodes themselves to perform the rectification needed for maintaining the electrolyte negative with respect to the anodes. Such maintenance of the charge is known as "excitation". This can be done by impressing unidirectional positive voltage and current of suitable value upon the anodes, as in my prior Patent No. 1,077,628, above mentioned. A rectifier entirely outside of the condenser may be used for the purpose, taking alternating voltage and current from the circuit with which the condenser is connected. In another method the rectifying electrode or electrodes are immersed in the electrolyte of the condenser and a higher alternating voltage is impressed on them than on the condenser anodes, as described and claimed in my Patent No. 1,889,415, of November 29, 1932. A higher voltage on the rectifier causes the latter to provide all or substantially all the negative charge, thus relieving the condenser anodes of the corrosion and loss of efficiency incident to the rectifying action needed for replacement and maintenance of such charge. To be sure, the rectifier electrodes are attacked and may be eventually consumed, but they can be in the form of small, relatively thick rods, blocks, or the like, which are cheap and easily replaced.

When unalloyed aluminum is used as a rectifying electrode it performs at first quite well in respect both to efficiency and to the value of the unidirectional voltage delivered. The electrolyte may be one which is desirable in a condenser, but it has been found that in the case of pure (i. e., unalloyed) aluminum electrodes electrolytes best for condensers are in general less advantageous for rectifiers. The converse is also true. For instance the now common borax and boric acid solution, say one containing 180 grams boric acid and 60 grams borax per liter of water, is excellent for a condenser, whereas in a rectifier a phosphate solution, acidulated with, say, phosphoric acid, usually gives better results. This characteristic is a distinct disadvantage in many cases, as for example where it is desired to put the electrode or electrodes of an exciting device in the same container with the anodes of the condenser which is to be excited thereby, as for example in my prior Patent No. 1,889,415 referred to above.

The main difficulty with unalloyed aluminum for electrodes which are to have a rectifying action is that although the apparatus performs well at first it soon begins to deteriorate, even in the most suitable electrolyte, both as to efficiency and as to the voltage delivered. I have found, however, that aluminum alloys, notably aluminum-copper, aluminum-magnesium, aluminum-magnesium-copper, aluminum-nickel, aluminum-cadmium, aluminum-cadmium-nickel, aluminum-calcium, and aluminum-calcium-nickel, give better results than unalloyed aluminum, especially in a condenser electrolyte, for example one of the borate type. Of the metals mentioned I prefer the aluminum-calcium alloys which I have described and claimed in my Patent No. 1,908,039, of May 9, 1933, particularly aluminum-calcium-nickel; or the aluminum-cadmium alloys described in my Patent No. 1,889,417, of November 29, 1932, particularly aluminum-cadmium-nickel.

Desiring further to improve the operation of electrolytic rectifiers I have devised my present invention, which has for its chief object to provide a rectifier which will not only have good initial efficiency but will also maintain a good efficiency in the course of long continued operation. To this and other ends the invention comprises the novel features hereinafter described.

In the course of my work with aluminum alloys in electrolytic rectifiers I found that some of the alloys which appear to give the best results electrically have certain disadvantages of what may be called a physical or mechanical nature. Thus the alloys tend to be brittle, and to break easily, in some cases breaking merely by being dropped on the floor. Some alloys are also viscous when molten, and are difficult to pour in casting the electrodes. I also found that on alloy electrodes in a rectifier a scale-like formation was often produced in the course of time, though to a less extent than on electrodes of unalloyed aluminum, and I believe this scale is largely responsible for the poor performance of pure (i. e., unalloyed) aluminum electrodes in a rectifier. In my efforts to improve the rectifying characteristics from the standpoint of efficiency, life, and voltage delivered, I have discovered that the addition of glass, or, in general, an alkali metal silicate or alkaline earth metal silicate, to the metal of the electrode, whether aluminum or alloy of aluminum, has a beneficial result, and also that in general such addition increases the fluidity of the molten metal, making casting easier, and in the case of the more brittle alloys has a toughening effect. The electrical effects, so to speak, are also advantageous. For example, using as anodes in a condenser aluminum alloy electrodes made with the silicate addition, I have found that they have a greater capacity per unit area of electrode surface (in the case of the aluminum-cadmium-nickel alloy the capacity may be five times greater) than electrodes made of unalloyed aluminum, and that the condenser has a lower power factor. This is a substantial advantage, since with these new alloys the condenser can be made much smaller for a given capacity, and with a lower power factor. The latter is especially important, by reason of the fact that the lower the power factor the less the losses and hence the greater the efficiency of the apparatus.

In the case of aluminum-copper alloys, with or without magnesium, tantalum or titanium, or two or more of such metals, I prefer a copper content of about 8 per cent. In aluminum-cadmium alloys, I prefer at least 5 per cent of cadmium, though less may be used with advantageous results. As much cadmium may be used as the alloy will take up, but I have not found that more than 9.4 per cent offers any material advantage. The addition of nickel 2 to 6 per cent or more, preferably about 4 per cent, is advantageous. Instead of nickel I may use other metals such as copper, cobalt or silicon, but the electrical results are less advantageous. In general any two or more of the four elements just named may be used. The preferred composition is aluminum 87.7 per cent, cadmium 8.7 per cent, nickel 3.6 per cent, approximately. In the case of aluminum-calcium alloys, nickel is a desirable addition. Advantageous results can be obtained with less, but I prefer to use at least about 8.4 per cent calcium and 4 per cent nickel. A like amount of copper may be used but I consider nickel better. Of the latter element I may use as much as 6 per cent, and in some cases more, but I have not observed that the results are any better than with about 4 per cent. As for the calcium content I have not found that more than 10 per cent offers any material advantage but the composition is not limited to that amount since the alloy may contain calcium up to the maximum that can be alloyed with aluminum or with aluminum and nickel. Eight per cent of calcium is a good average amount, with 4 per cent of nickel. Instead of nickel I may use other metals such as copper, cobalt or silicon, though nickel is better. In general the alloy may contain any two or more of the four elements just named. Electrodes made of the aluminum-copper alloys referred to above are described and claimed in my prior Patent No. 1,889,415 of November 29, 1932, electrodes made of the aluminum-cadmium alloys in my prior Patent No. 1,889,417 of the same date, and electrodes made of the aluminum-calcium alloys in my prior Patent No. 1,908,039 of May 9, 1933.

The silicate may be added to the molten metal in the form of the ordinary sodium silicates of commerce (preferably preheated to drive off the water that it may contain), stirring small amounts into the melt until, preferably, the alloy ceases to become more fluid. Another method is to add the silicate in the form of ordinary glass, preferably one containing no lead or at most very little. Excellent results have been obtained with soda-lime glass, having the approximate analysis, by weight: silicon dioxide ($SiO_2$), 72.3 per cent; aluminum oxide ($Al_2O_3$), 0.90; ferric oxide ($Fe_2O_3$), 0.22; titanium dioxide ($TiO_2$), 0.02; calcium oxide (CaO), 8.78; magnesium oxide (MgO), 0.05; potassium oxide ($K_2O$), 2.26; sodium oxide ($Na_2O$), 14.8. In using glass considerable difficulty is experienced in making the glass dissolve or be taken up by the molten metal, and it is therefore advantageous to add the glass in the form of "wool", a little at a time, with thorough stirring, preferably adding as much as the metal will take up or until the metal ceases to become more fluid. Lesser amounts are beneficial, though generally to a less extent. Casting in a chill mold is desirable, as giving a finer grain or crystal structure than does slow cooling. Another method, particularly convenient when a large amount of metal is to be prepared, is to melt the metal in or pour the molten metal into a glass lined crucible and stir it therein until the desired amount of glass has been taken up from the lining. The metal to which the silicate has been added should be cast promptly after the addition. The electrode may be a casting, with or without dressing or machining, or the metal may be cast in the form of an ingot and the electrode then made therefrom by any suitable working. For rectifying electrodes, the casting method is usually the most convenient, since such electrodes should, in general, be relatively thick. For condenser anodes a large area of surface is desirable and a thickness greater than a few thousandths of an inch is unimportant, in fact is undesirable as merely adding weight and cost without compensating advantage, and hence for such use rolled sheet metal may be used, or the alloy may be cast in thin plates.

In the accompanying drawing, showing three forms of electrolytic apparatus in which the filmed electrodes (at least the rectifying electrodes) may be made of an alloy of the present invention:

Fig. 1 illustrates diagrammatically an electrolytic condenser and a full-wave electrolytic rectifier in the same electrolyte to excite the condenser, with an autotransformer for impressing a higher voltage on the rectifying electrodes than on the filmed electrodes of the condenser.

Fig. 2 illustrates diagramatically an electrolytic condenser and a full-wave rectifier in the same electrolyte to excite the condenser, with the same voltage impressed on the rectifying electrodes as on the filmed electrodes of the condenser.

Fig. 3 illustrates diagrammatically a full-wave rectifier for supplying direct current and voltage to an external translating device.

The above Figs. 1 and 2 are taken from my prior Patent No. 1,889,415, referred to above (in which they are Figs. 1 and 3, respectively), but it is to be understood that the invention is not limited to apparatus of these specific types but may be used in other devices as well, including the others illustrated in the patent just mentioned and those shown in my other patents hereinbefore referred to.

In Figs. 1 and 2, 10, 11 are the terminals of the apparatus, by which it may be connected to an alternating current circuit. The vessel or tank containing the electrolyte is shown at 12. The condenser electrodes (anodes) 13, 13' are connected to the terminals, and the rectifier electrodes 14, 14', giving full-wave rectification, are connected to the same terminals, directly in Fig. 2, but through a step-up autotransformer T in Fig. 1, so that in the latter figure voltage impressed on the rectifier electrodes is higher than that on the anodes 13, 13'. It is explained in my prior Patent No. 1,077,628, issued November 4, 1913, that an electrolytic condenser in operation has its electrolyte negative with respect to the anodes, and that in the absence of other means for the purpose the negative charge is supplied initially and afterwards maintained by a rectifying action of the anodes. This rectifying action involves corrosion of the anodes due to breakdown ("perforation") and re-formation of the anode films. In the apparatus illustrated in Figs. 1 and 2 herein, this rectifying action is performed by the rectifier electrodes 14, 14', which, together with the electrolyte in which they are immersed, constitute in one sense an auxiliary condenser. Thus in Fig. 1, assume an impulse of alternating current and voltage coming in on terminal 10. By reason of the higher positive voltage on electrode 14 that on anode 13, all or substantially all the leakage current necessary to charge the electrolyte negative will be supplied by electrode 14; and since the difference of potential between electrodes 14 and 14' is greater than that between anodes 13 and 13', the leakage current from anode 13 and electrode 14 will flow to electrode 14' rather than to anode 13', thus relieving the latter of the breakdown of its film which would occur if the leakage current went to anode 13'. It is to be understood that leakage of current from an electrode by conduction through its film to the electrolyte does no harm to the underlying metal unless the current in so doing re-forms the film at a point or points where it had previously been broken down by conductive flow of current in the opposite direction. Hence if but little leakage current flows into anodes 13, 13', injury due to leakage from the anodes is correspondingly slight. In Fig. 2, if the instantaneous direction of the alternating current is from terminal 10 to terminal 11, current leaking through the film on anode 13 will find a path of lower resistance to the rectifier electrode 14' than to the other anode 13'. Hence the anode films are subject to little if any breakdown due to flow of leakage current from the electrolyte. In other words the anodes are always positive with respect to the electrolyte, 30 less such voltage drop as may occur between the anodes and the rectifier electrodes. The same is true for the device shown in Fig. 1.

In Fig. 3 the rectifying electrodes 15, 15' are connected to an autotransformer T' which is itself connected to the input terminals 16, 16' by which the apparatus may be connected to a source of alternating current and voltage. For delivering direct current and voltage to an external device, for instance a motor 17, output terminals R, R' are provided, the former connected to the neutral point of the transformer and the other to the non-filming electrode 18 immersed in the electrolyte in the vessel or tank 19. Assuming an impulse of alternating current coming in through terminal 16', the flow will be through terminal R, motor 17, terminal R', electrode 18, the electrolyte, and filmed electrode 15 to terminal 16. When the alternating current reverses, the flow is from terminal 16 through the motor as just traced, thence to the unfilmed electrode and through filmed electrode 15' to terminal 16'. Thus the direction of the output is constant, or in other words, the impressed alternating current and voltage are rectified.

In rectifiers an important advantage that I have observed, especially with aluminum-calcium and aluminum-cadmium alloys, is that the output voltage suffers less decrease in long continued operation of the device. For example, a rectifier with electrodes of aluminum-calcium-nickel alloy without the silicate addition was operated for 1700 hours, with capacity in parallel with the load. Initially, with 211 volts (alternating) on its input terminals the rectified output voltage was 128, giving a voltage ratio, output to input, of $128/211 = .607$. The output voltage slowly fell, until at the end of 1700 hours' operation it was 110 volts, the input-output ratio being then $110/214 = .514$. That is, the output voltage had dropped to $.514/.607 = .847$ of its initial value, a decrease of about 15 per cent. The electrodes were then replaced with others of the same alloy with the addition of glass, and the apparatus again put on circuit. At the start, with 215 volts A. C. impressed, the D. C. output voltage was 131, the input-output ratio being then 131/215=.609. After 2081 hours of operation the ratio was 130/216=.602. That is, the ratio was .602/.609= .988 of its initial value, a decrease of less than 1.5 per cent.

I have also found that a fine-grained structure of the alloy is an important factor in the performance of the electrodes, and that such a structure is best obtained by chill-casting in a cold mold with the metal at the lowest possible pouring temperature, so as to cause rapid solidification. I have further found that the addition of glass or other silicate described herein conduces to the desired grain structure of the casting, and that the mold may be hotter, with less rapid solidification of the metal.

The amount of glass or other silicate needed for the desired results may vary considerably, depending in general upon the composition of the alloy and of the material to be added. For instance, good results have been obtained with the aluminum-calcium-nickel alloy by the addition of about 3⅓ per cent of "water glass", previously heated to redness to drive off its content of water. On the other hand, with the same alloy about 0.4 per cent of glass wool of the analysis given above was equally effective. In any case a suitable amount can be determined by a few trials, the results being judged by the increasing fluidity of the metal as the material is added, or by the effect upon the grain size of the casting, or both.

The addition of glass or other silicate is also advantageous in the case of pure, i. e., unalloyed, aluminum.

I do not claim broadly herein aluminum and aluminum-alloy having the glass or other silicate addition, but will do so in a later application.

It is to be understood that the invention is not limited to the examples herein specifically described but can be embodied in other species without departure from its spirit as defined by the following claims.

I claim—

1. An electrode for electrolytic rectifiers and condensers, made of aluminum to which has been added a silicate of a base of the class consisting of the alkali and alkaline earth metals.

2. An electrode for electrolytic rectifiers and condensers made of aluminum to which has been added an alkali metal silicate.

3. An electrode for electrolytic rectifiers and condensers made of aluminum to which glass has been added.

4. A filming electrode for electrolytic rectifiers and condensers, composed of metal to which a silicate of a base of the class composed of the alkali and alkaline earth elements has been added, said metal being aluminum alloyed with at least one of the metals of the class consisting of cadmium, calcium, copper and magnesium.

5. A filming electrode for electrolytic rectifiers and condensers, composed of metal to which a silicate of a base of the class composed of the alkali and alkaline earth elements has been added, said metal being aluminum alloyed with at least one of the metals of the class consisting of cadium and calcium.

6. A filming electrode for electrolytic rectifiers and condensers, composed of metal to which glass has been added, said metal being aluminum-cadmium alloy.

7. A filming electrode for electrolytic rectifiers and condensers, composed of metal to which glass has been added, said metal being aluminum-cadmium alloy containing nickel.

8. A filming electrode for electrolytic rectifiers and condensers, composed of metal to which glass has been added, said metal being aluminum-calcium alloy.

9. A filming electrode for electrolytic rectifiers and condensers, composed of metal to which glass has been added, said metal being aluminum-calcium alloy containing nickel.

RALPH D. MERSHON.